(12) United States Patent
Yoshioka

(10) Patent No.: US 6,441,882 B1
(45) Date of Patent: Aug. 27, 2002

(54) CONDUCTION DEFECT CORRECTING METHOD FOR LIQUID CRYSTAL DISPLAY DEVICE AND MANUFACTURING METHOD THEREOF

(75) Inventor: Kouichi Yoshioka, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 40 days.

(21) Appl. No.: 09/671,474

(22) Filed: Sep. 27, 2000

(30) Foreign Application Priority Data

Sep. 28, 1999 (JP) .......................... 11-275207
Jul. 19, 2000 (JP) ...................... 2000-219632

(51) Int. Cl.⁷ .......................................... G02F 1/1337
(52) U.S. Cl. ................... 349/192; 349/153; 349/155
(58) Field of Search .......................... 345/56; 349/192

(56) References Cited

U.S. PATENT DOCUMENTS

| 4,600,273 A | * | 7/1986 | Ohno | 349/153 |
| 5,556,670 A | * | 9/1996 | Mihara et al. | 349/153 |
| 6,108,057 A | * | 8/2000 | Kusanagi | 349/153 |

FOREIGN PATENT DOCUMENTS

| JP | 2-301722 | 12/1990 |
| JP | 3-245125 | 10/1991 |

* cited by examiner

*Primary Examiner*—James Dudek
(74) *Attorney, Agent, or Firm*—David G. Conlin; Dike, Bronstein, et al.,; IP Practice Group of Edwards & Angell

(57) ABSTRACT

In a liquid crystal panel, a scanning electrode is formed on an upper substrate, and a scanning electrode terminal, a data electrode, and a data electrode terminal are formed on a lower substrate. The scanning electrode and the data electrode are opposed to each other via a liquid crystal material. Conducting members which are disposed in a sealing member and have conductivity are sandwiched between the scanning electrode and the scanning electrode terminal. Ac voltage is applied from the scanning electrode terminal and the data electrode terminal so as to apply ac voltage between the scanning electrode and the scanning electrode terminal via the data electrode and the liquid crystal material, thereby correcting a conduction defect on the conducting part. This method makes it possible to correct a conduction defect on a conducting member in a liquid crystal display device, which is provided with the conducting part between the substrates, so as to improve display quality and a yield of the liquid crystal display device.

15 Claims, 10 Drawing Sheets

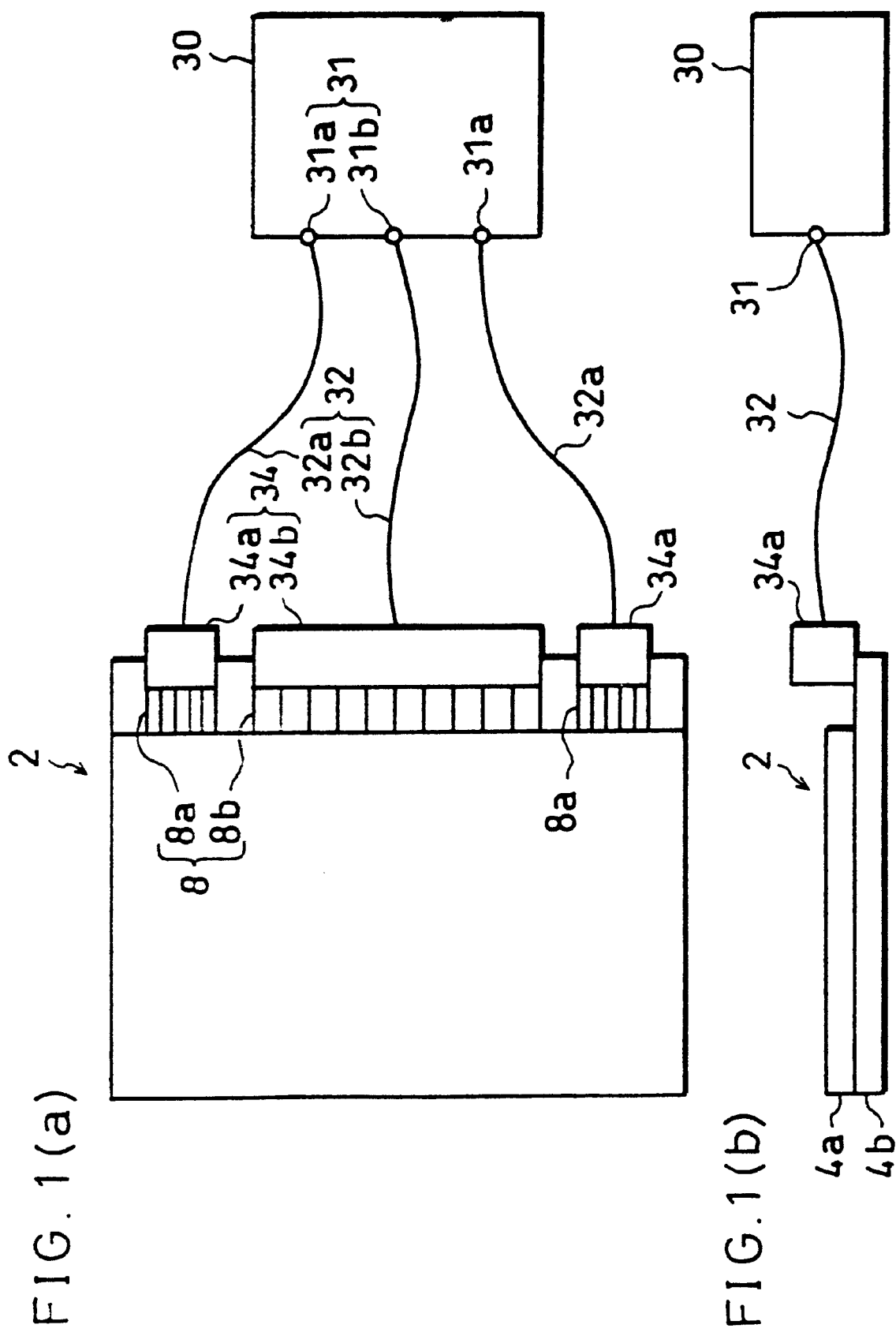

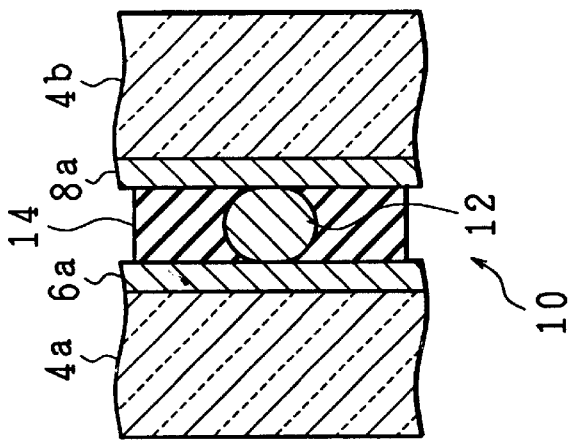
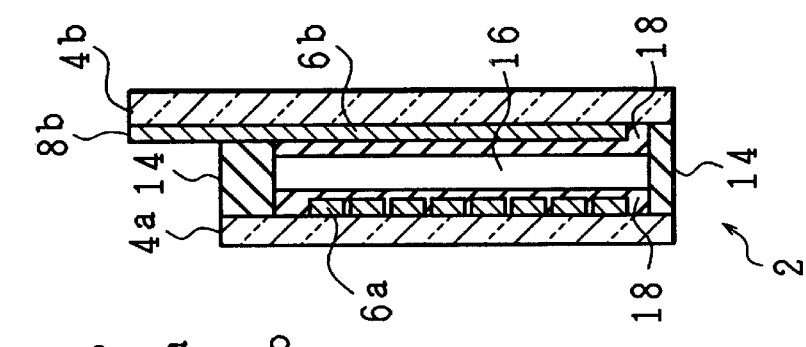
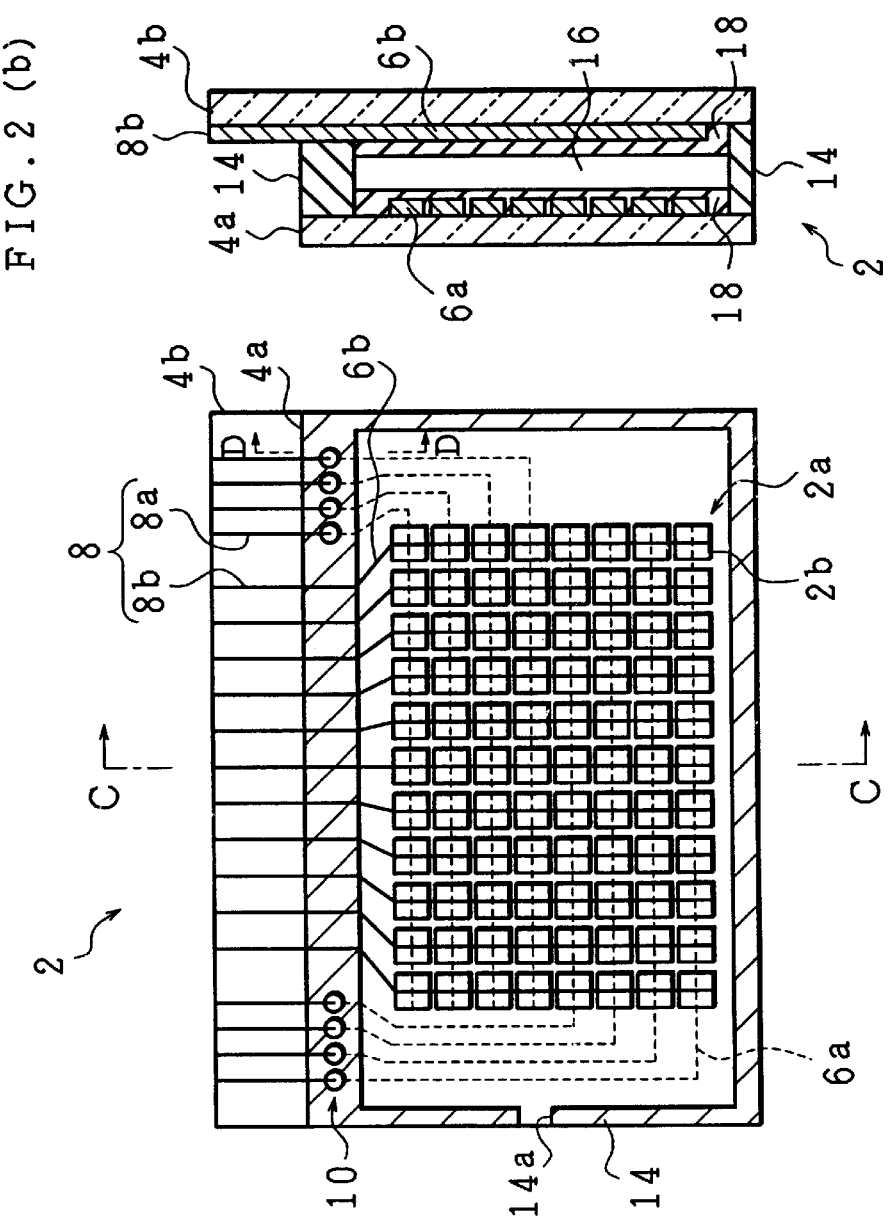

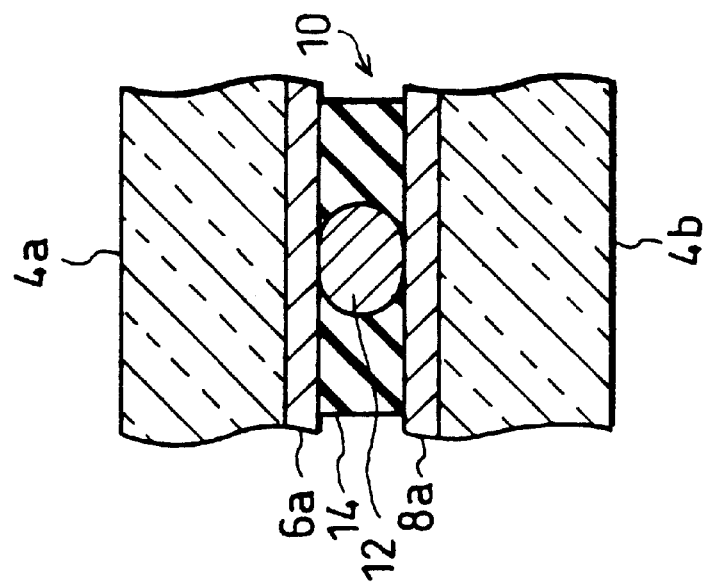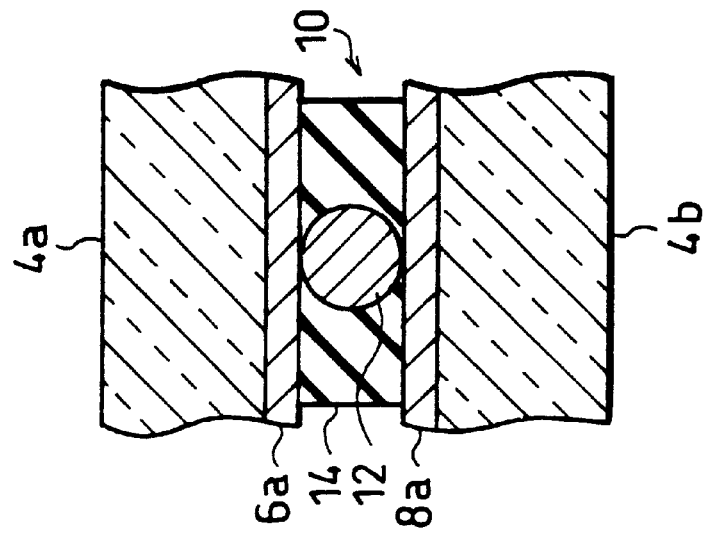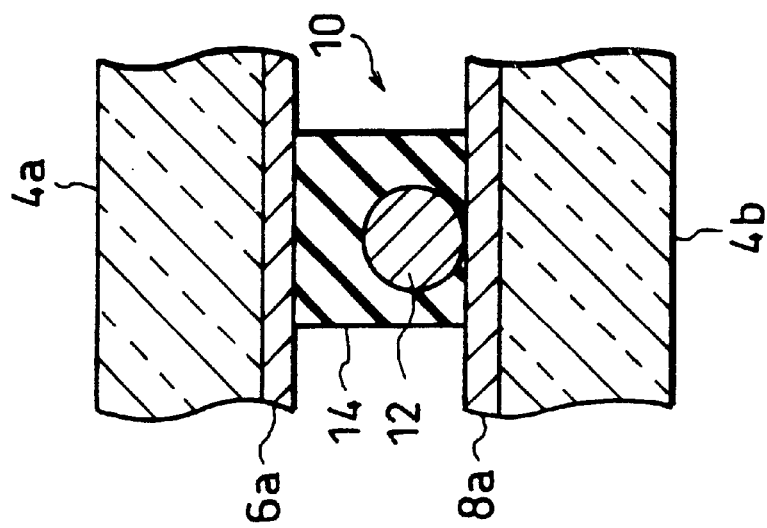

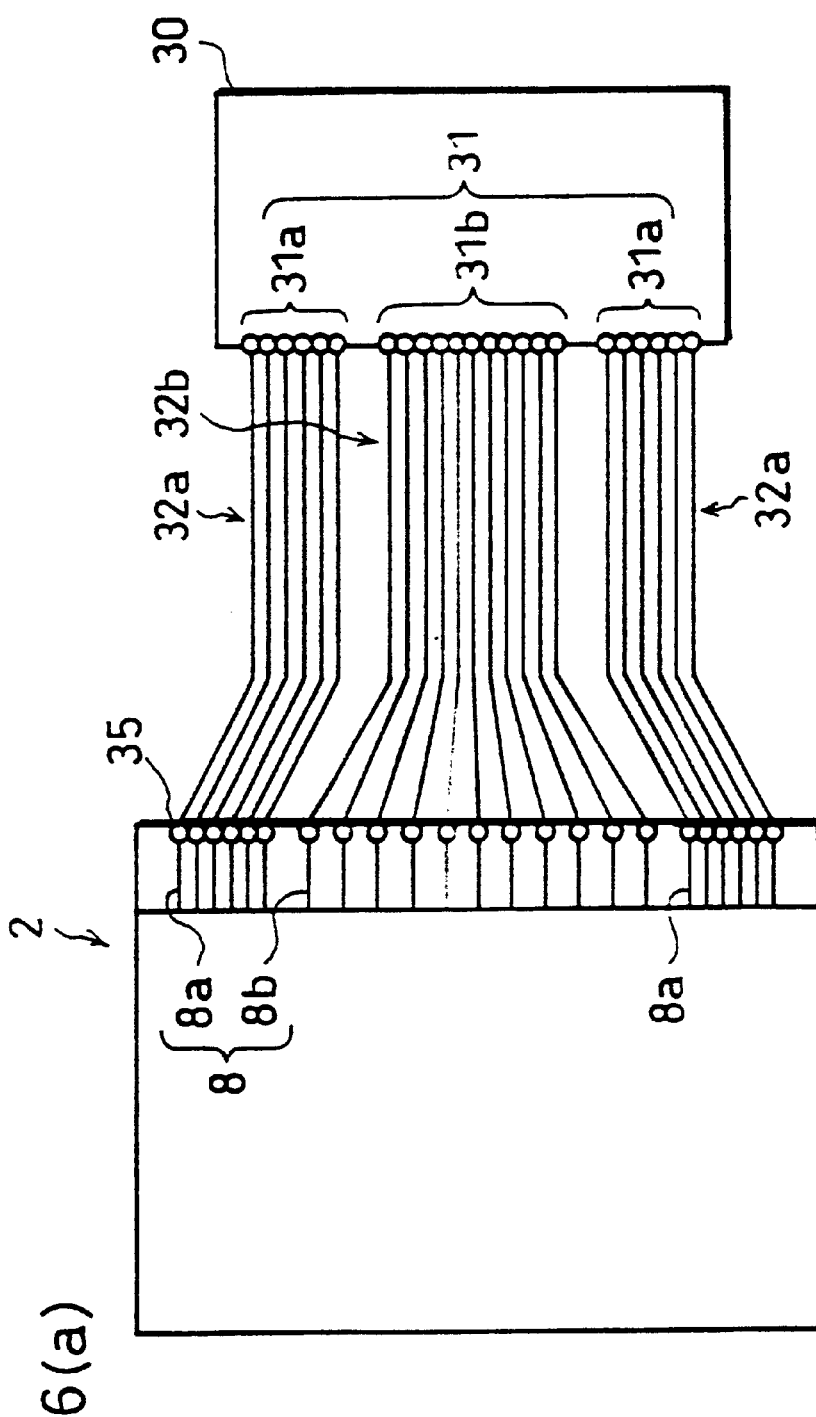
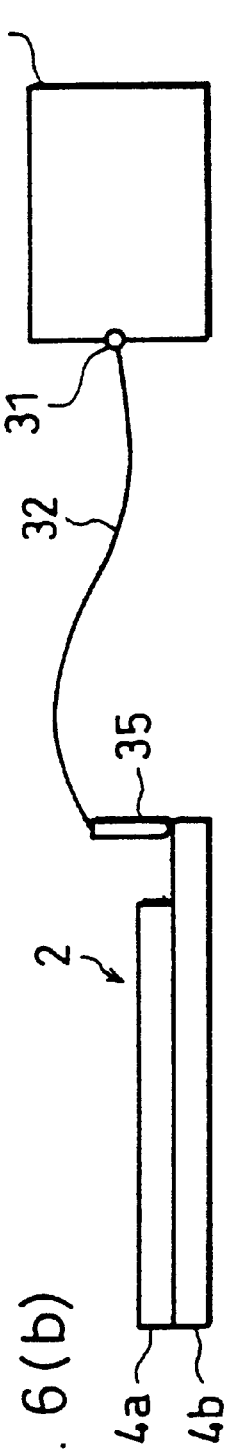
FIG. 6(a)
FIG. 6(b)

CONDUCTION DEFECT CORRECTING METHOD FOR LIQUID CRYSTAL DISPLAY DEVICE AND MANUFACTURING METHOD THEREOF

FIELD OF THE INVENTION

The present invention relates to a method for correcting a conduction defect in a liquid crystal display device and a manufacturing method of the liquid crystal display device using the method, particularly to a method of correcting a conduction defect on a conducting part, which is provided between substrates in a liquid crystal panel.

BACKGROUND OF THE INVENTION

A liquid crystal display device according to a direct matrix method (direct matrix liquid crystal display) is provided with a pair of substrates. An electrode pattern composed of transparent electrodes such as an ITO is formed on each of the substrates, and an alignment film made of a material such as polyimide is formed thereon so as to cover the electrode pattern. A pair of the substrates are fixed to each other at the circumference with a sealing material, which is made of a material such as an epoxy resin, while surfaces of the substrates, that have the electrode patterns, are opposed to each other and spacers maintain a predetermined gap therebetween. Further, a liquid crystal material is filled into a gap surrounded by a sealing member at the circumference between the substrates.

In the direct matrix liquid crystal display device with such a construction, voltage is applied between the electrode patterns formed on the substrates so as to generate an electric field in a liquid crystal material at a position (cell) where the electrode patterns are opposed to each other. With this arrangement, a polarizing property of the liquid crystal material is controlled so as to display an image.

In the above direct matrix liquid crystal display device, the ends of the electrode pattern are drawn to the ends of the substrates to connect a driver for applying voltage between the electrode patterns, so as to form a terminal part. In some direct matrix liquid crystal display devices, a terminal part is disposed only on one of the substrates to connect terminals together to the driver. In such a direct matrix liquid crystal display device, conducting members made of carbon paste and silver paste are disposed between the substrates so as to form a conducting part, in order to connect the terminal part and the electrode pattern on the substrate having no terminal part thereon.

Referring to FIGS. 8(a) and 8(b), the following explanation describes the construction of a conducting part according to a conventional art. FIG. 8(a) is a plan view showing the construction of the conducting part in accordance with the conventional direct matrix liquid crystal display device. FIG. 8(b) is a sectional view taken along A—A line shown in FIG. 8(a).

The direct matrix liquid crystal display device has a construction in which a scanning electrode terminal 104 and a scanning electrode 110 are brought into electrical conduction via conducting members 106. The scanning electrode terminal 104 is formed on a lower substrate 102 and the scanning electrodes 110 are formed on an upper substrate 108. Further, a large number of the scanning electrodes 110 form an electrode pattern of the upper substrate 108. Here, the conducting members 106 are patterned and formed according to printing method and so on, and conduction is made between the scanning electrode terminal 104 and the scanning electrodes 110 with a one-to-one correspondence.

Moreover, a sealing member 112 is disposed at the circumference of the upper substrate 108 so as to surround the electrode pattern composed of the scanning electrodes 110. Besides, liquid crystal material (not shown) is sealed into an area surrounded by the upper substrate 108, the lower substrate 102, and the sealing member 112. Here, an alignment film, data electrodes forming the lower substrate 102, and a data electrode terminal connected to a data electrode are omitted in FIGS. 8(a) and 8(b).

In the conducting part with such a construction, a conduction defect or a broken wire has hardly occurred between the scanning electrode terminal 104 and the scanning electrodes 110.

However, in the case of the construction in which the conducting part is formed according to the printing method and so on, it has been difficult to meet the needs for a larger display capacity of a liquid crystal display device and a fine pitch of an electrode pattern.

Thus, a construction has been adopted in which fine conducting members are dispersed into a sealing member so as to form a conducting part. Referring to FIGS. 9(a) and 9(b), the following discusses the above construction. FIG. 9(a) is a plan view showing another construction of the conducting part according to a conventional direct matrix liquid crystal display device. FIG. 9(b) is a sectional view taken along line B—B shown in FIG. 9(a). Those members that have the same functions and are described referring to FIGS. 8(a) and 8(b) are indicated by the same reference numerals and the description thereof is omitted.

In this construction, conducting members 114 are used in place of the conducting members 106 of FIGS. 8(a) and 8(b). Further, the conducting m embers 114 are disposed in the sealing member 112 so as to form a conducting part.

The conducting part is formed as follows: particles serving as the conducting members 114 with conductivity are dispersed into the sealing member 112, and an upper substrate 108 and a lower substrate 102 are bonded to each other via the sealing member 112. Here, when bonding the upper substrate 108 and the lower substrate 102 together, a suitable pressure is applied. This arrangement makes it possible to squeeze and remove a material of the sealing member 112, which is disposed between the conducting members 114, a scanning electrode terminal 104, and a scanning electrode 110. Thus, the conducting members 114, the scanning electrode terminal 104, and the scanning electrode 110 directly come into contact with one another so as to secure conduction.

However, when the conducting part of FIGS. 9(a) and 9(b) is formed according to the above method, a material of the sealing member 112 (hereinafter, referred to as an intermediate sealing member) cannot be sufficiently removed in some of a large number of the conducting parts, so that sufficient conduction may not be achieved.

In this case, the conducting part is formed between the scanning electrode terminal 104 and the scanning electrodes 110. Thus, when a voltage is applied to the scanning electrode terminal 104, the conducting part with insufficient conduction, i.e., the conducting part with a high electrical resistance (hereinafter, referred to as a defective conducting part) may cause a drop in voltage. Hence, on a liquid crystal display composed of the scanning electrodes 110 connected to the defective conducting part, a displayed image becomes less sharp or a display itself becomes unavailable. Hence, irregularity or a defect occurs on a displayed image, causing deterioration in display quality.

The defective conducting part is formed under the influence of smoothness and flexibility on the upper and lower substrates 108 and 102 (hereinafter, simply referred to as substrates), and irregular pressures for bonding the substrates.

Also, particularly when a polymeric material such as plastic and resin is used for the substrates, the foregoing problem is more likely to occur. The polymeric material is generally smaller than a material such as glass in hardness on a surface (surface hardness), and the polymeric material is inferior in smoothness as well.

When glass, is used for the substrates, a pressure applied for bonding the substrates causes deformation, but the pressure is small on a part of the substrates that opposes the conducting member 114. Therefore, a pressure is sufficiently applied to the intermediate sealing member so as to completely remove the intermediate sealing member.

Meanwhile, when plastic is used for the substrates, a pressure applied for bonding the substrates results in large deformation on a part of the substrates that opposes the conducting member 114, so that a pressure cannot be sufficiently applied to the intermediate sealing member. Thus, it is difficult to completely remove the intermediate sealing member. Therefore, the conducting member 114 is still coated with the intermediate sealing member so as to increase a contact resistance (connection resistance).

In response, contact on the conducting part may be corrected by mechanical working (physical working) such as partial application of pressure. However, it is difficult for the mechanical working to correct the contact because the conducting member 114 has a small diameter of about 10 $\mu$m and the intermediate member 114 has a thickness which is about one tenth of the diameter (1 $\mu$m) of the conducting member 114. Furthermore, in the case of the mechanical working, another problem such as a damage (crack, chip, etc.) may appear.

Meanwhile, unlike the mechanical working, publications such as Japanese Unexamined Patent Publication No. 301722/1990 (Tokukaihei 2-301722, published on Dec. 13, 1990) and Japanese Unexamined Patent Publication No. 245125/1991 (Tokukaihei 3-245125, published on Oct. 31, 1991) disclose methods of performing electrical working on a defect of a electrode formed on a substrate.

However, Tokukaihei 2-301722 discloses a method of correcting a short-circuit defect, in which a short circuit occurs between electrodes to be insulated on the substrate. And then, a current which is sufficiently high to melt an electrode is applied in this method. For this reason, this method is not suitable for solving the foregoing problem. Although this publication takes dc, ac, and pulse waveforms as examples of current to be applied to an electrode but does not discuss any proper conditions for a practical use. Consequently, this method cannot be put into practical use.

Besides, Tokukaihei 3-245125 discloses a method wherein a defective part on a wire is cut in advance by applying a high voltage to an electrode, so as to select a defective product. A break may appear on the defective wire over time. Thus, this method is not suitable for solving the foregoing problem. Further, since this method instantly applies a voltage of about 5 kV, a liquid crystal material may be subjected to electrolysis.

SUMMARY OF THE INVENTION

The objective of the present invention is to provide a conduction defect correcting method for a liquid crystal display device and a manufacturing method thereof, that is capable of correcting a conduction defect appearing on a conducting part so as to improve display quality of the liquid crystal display device and a manufacturing yield while preventing a mechanical working, etc. from causing damage on a substrate in the liquid crystal display device, which includes the conducting parts for providing conduction between the substrates.

In order to attain the above objective, the conduction defect correcting method for the liquid crystal display device of the present invention, the device including a pair of substrates having a liquid crystal material therebetween, conductive wires respectively formed on opposing surfaces of the substrates, conducting parts having conducting members with conductivity between the conductive wires, and a sealing member provided around the conducting parts to bond a pair of the substrates together, the method including a step of applying ac voltage to the conducting parts from the conductive wires in the liquid crystal display device.

According to this method, ac voltage is applied from the conductive wires to the conducting parts surrounded by the sealing member while the conducting members with conductivity are sandwiched between the conductive wires formed on the substrates.

In the conducting part, the conductive wires and the conducting members are brought into contact with each other so as to make electrical conduction. However, the sealing member is provided around the conducting part, so that the sealing member may remain between the conductive wires and the conducting parts particularly in a forming process of the sealing member so as to interfere with electrical conduction.

In contrast, according to the foregoing method, when ac voltage is applied from the conductive wires, heat is generated on the conducting part having a conduction defect. The heat is caused by dielectric dissipation in the sealing member disposed between the conductive wires and the sealing member. The sealing member is softened by heating, so that the sealing member may be removed between the conductive wires and the conducting members. Or application of ac voltage from the conductive wires may cause puncture in a thin film of the intermediate sealing member. These effects achieved by application of ac voltage make it possible to improve contact between the conductive wires and the conducting members so as to correct a conduction defect.

As a result, in the liquid crystal display device, it is possible to prevent degradation in display quality resulted from a conduction defect on the conducting part. Also, it is possible to suppress a reduction in yield that is caused by a conduction defect.

With the above method, the conduction defect correcting method for the liquid crystal display device according to the present invention preferably applies the ac voltage to a plurality of the conducting parts in parallel.

According to the above method, when a plurality of the conducting parts are provided, ac voltage is applied to the conducting parts in parallel. This arrangement makes it possible to apply equal voltages to the conducting parts so as to simultaneously correct the conduction defects of the conducting parts. Thus, it is possible to equalize contact resistances on the conducting parts so as to suppress unevenness, etc. on a display image.

Besides, in order to apply ac voltage in parallel, it is only necessary to apply voltage simultaneously to electrode wires on each of the substrates so as to simplify the construction for applying ac voltage.

Consequently, the simple construction makes it possible to improve the display quality of the liquid crystal display device.

With the above method, the conduction defect correcting method for the liquid crystal display device according to the present invention preferably has the following construction: a first electrode and a second electrode are formed respectively on the substrates so as to be opposed to each other via the liquid crystal material, conductive wires formed on one of the substrates act as the first electrode, conductive wires formed on the other substrate act as a first terminal for applying a potential to the first electrode, and the ac voltage is applied between the first terminal and a second terminal for applying a potential to the second electrode.

According to this method, like a direct matrix liquid crystal display device, the ac voltage is applied between the first terminal and the second terminal in the liquid crystal display device, in which the first electrode and the second electrode are opposed to each other via the liquid crystal material, the first terminal and the second terminal are provided for applying a potential respectively to the electrodes, and the conducting parts are formed between the first electrode and the first terminal.

According to the above method, ac voltage is applied between the first terminal and the second terminal so as to apply ac voltage between the first electrode and the first terminal from the second electrode via the liquid crystal material, that is, the conducting parts. Moreover, as the first terminal and the second terminal, it is possible to adopt terminals for connecting a driving circuit which drives the liquid crystal display device of the present invention.

Therefore, the above method can be practiced in a device which is substantially identical to an inspection device used for applying voltage between the first terminals and the second terminals, in a process such as a lighting display inspection in a manufacturing process of a liquid crystal display device, and the method can be practiced in successive steps.

As a result, it is possible to correct a conduction defect while reducing the number of the steps and simplifying the process and facilities by sharing an inspection device, an instrument and so on.

In order to attain the foregoing objective, the manufacturing method of the liquid crystal display device of the present invention, the device including the conductive wires which are formed on the opposing surfaces of a pair of the substrates having the liquid crystal material therebetween and which are electrically connected to each other via the conducting members with electrical conductivity that is disposed into the sealing member to bond a pair of the substrates together, the method including the step of applying ac voltage between the conductive wires after a pair of the substrates are bonded to each other while part of the sealing member that has said conducting member is disposed between the conductive wires.

According to this method, the substrates are bonded to each other while the sealing member having the conducting members dispersed therein are disposed between the conductive wires, so that the conducting members come into contact with the conductive wires. Thus, electrical conduction can be secured between the conductive wires. However, the conducting members have been dispersed in the sealing member, so that the sealing member may remain on a contact with the conductive wires, resulting in a conduction defect.

In contrast, according to the aforementioned method, ac voltage is applied between the conductive wires, so that heat is generated by dielectric dissipation in the sealing member, which provides insulation between the conductive wires, so as to soften the sealing member, or the sealing member is subjected to puncture. Consequently, the contact is improved so was to correct a conduction defect.

Consequently, in the manufacturing method of the liquid crystal display device, it is possible to correct a conduction defect while preventing damage on the substrate that is caused by a mechanical working such as a partial application of pressure for improving contact. Further, this arrangement makes it possible to improve a yield of the liquid crystal display device.

For a fuller understanding of the nature and advantages of the invention, reference should be made to the ensuing detailed description taken in conjunction with the accompanying drawings.

BRIEF DESCRIPTION OF THE DRAWINGS

FIG. 1(a) is a plan view showing a construction in which a conduction defect correcting method is carried out in accordance with one embodiment of the present invention. FIG. 1(b) is a view showing the construction.

FIG. 2(a) is a plan view showing a liquid crystal display panel of the present embodiment. FIG. 2(b) is a sectional view taken along line C—C shown in FIG. 2(a). FIG. 2(c) is a sectional view (enlarged view) taken along line D—D shown in FIG. 2(a).

FIGS. 4(a) to 4(c) are sectional views showing the order of forming steps of a conducting part.

FIG. 6(a) is a plan view showing another construction in which the conduction defect correcting method is carried out in accordance with one embodiment of the present invention. FIG. 6(b) is a side view showing the construction.

FIG. 10(a) shows a status before correction, and FIG. 10(b) shows a status after correction.

DESCRIPTION OF THE EMBODIMENTS

Figure 3:
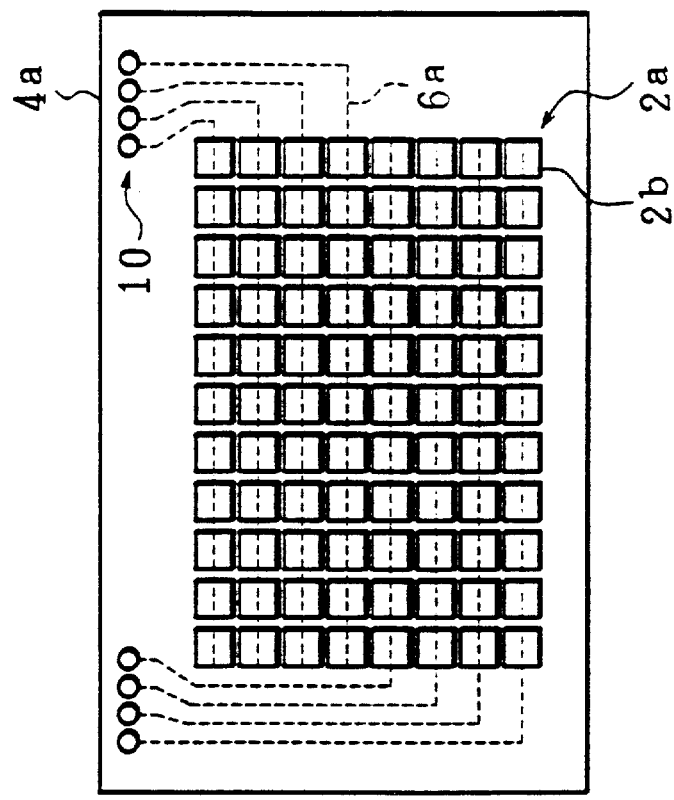
FIG. 3(a) is a plan view showing a lower substrate of the liquid crystal panel.
FIG. 3(b) is a plan view showing an upper substrate.
Figure 3:
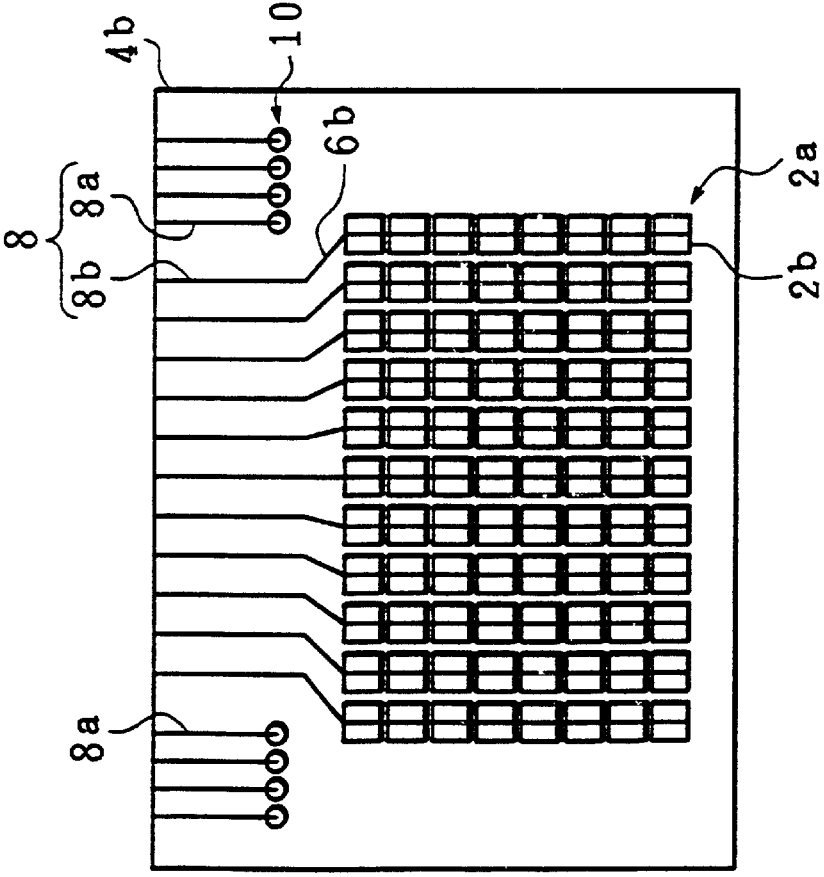

Referring to FIGS. 1(a) to 7(a), and FIGS. 10(a) and 10(b), the following explanation describes one embodiment of the present embodiment. First, referring to FIGS. 2(a) to 3(b), an example of a liquid crystal panel is discussed according to the present embodiment. FIG. 2(a) is a plan view showing a liquid crystal panel 2 of the present embodiment. FIG. 2(b) is a sectional view taken along C—C line shown in FIG. 2(a). FIG. 2(c) is a sectional view (enlarged view) taken along D—D line shown in FIG. 2(a). Further, FIG. 3(a) is a plan view showing a lower substrate (substrate) 4b of the liquid crystal panel 2. FIG. 3(b) is a plan view showing an upper substrate (substrate) 4a. Here, FIGS. 3(a) and 3(b) are plan views taken in the same direction as FIG. 2(a).

The liquid crystal panel 2 has a construction in which the upper substrate 4a on a display side and the lower substrate 4b on the back are bonded to each other at the circumference with a sealing member 14 while a liquid crystal material 16 is sandwiched therebetween. The sealing member 14 has an opening 14a for filling the liquid crystal material 16. The opening 14a is sealed after the liquid crystal material 16 is filled. Here, in FIG. 2(a), the sealing member 14 is shown by sloped lines.

The opposing surfaces of the upper substrate 4a and the lower substrate 4b are respectively provided with scanning electrodes (upper electrode, conductive wire, first electrode) 6a and data electrodes (lower electrode, second electrode) 6b. The scanning electrodes 6a and the data electrodes 6b are composed of a plurality of line electrodes arranged in stripes respectively. In FIGS. 2(a), 3(a), and 3(b), the scanning electrodes 6a are shown by dotted lines and the data electrodes 6b are shown by solid lines.

The scanning electrodes 6a and the data electrodes 6b are disposed so as to intersect at right angles on a display section 2a of the liquid crystal panel 2. Moreover, on parts where the scanning electrodes 6a and the data electrodes 6b are overlapped with each other via the liquid crystal material 16, cells 2b are formed as minimum units of image display. In FIGS. 2(a), 3(a), and 3(b), the cells 2b are shown in squares of solid lines. Here, on each of the upper substrate 4a and the lower substrate 4b, an alignment film 18 covers parts being in contact with the liquid crystal material 16 (on the scanning electrodes 6a and data electrodes 6b as well).

When providing a liquid crystal display on the liquid crystal panel 2, a potential is applied to the scanning electrodes 6a and the data electrodes 6b so as to generate an electric field on the cells 2b forming capacities (capacitors). And then, the generated electric field changes an optical property (polarizing property) of the liquid crystal material 16 so as to control the intensity of light transmitted through the liquid crystal panel 2, thereby forming a display image entirely on the display section 2a.

A potential to the scanning electrodes 6a and the data electrodes 6b is supplied from a driving circuit (not shown), which is connected to terminals 8 formed on an end of the liquid crystal panel 2. As the terminals 8, it is necessary to provide scanning electrode terminals (conductive wire, first terminal) 8a for applying a potential to the scanning electrodes 6a, and data electrode terminals (second terminal) 8b for applying a potential to the scanning electrodes 6b. In this case, the scanning electrodes 6a are formed on the upper substrate 4a, and the data electrodes 6b are formed on the lower substrate 4b, so that the scanning electrode terminals 8a and the data electrode terminals 8b may be respectively formed on the upper substrate 4a and the lower substrate 4b.

However, in this case, the scanning electrode terminals 8a and the data electrode terminals 8b are formed on the different substrates, so that the terminals 8 need to be separately connected to the driving circuit and so on. Consequently, a simple and small construction cannot be achieved.

Hence, the liquid crystal panel 2 of the present invention is provided with conducting parts (also referred to as COM transition, described later) 10 between the upper substrate 4a and the lower substrate 4b so as to form the scanning electrode terminals 8a and the data electrode terminals 8b on one of the substrates (in this case, the lower substrate 4b). Therefore, the data electrode terminals 8b are formed simply by extending the data electrodes 6b, and the scanning electrode terminals 8a are connected to the scanning electrodes 6a via the conducting parts 10. Here, in FIGS. 2(a), 3(a), and 3(b), the conducting parts 10 are shown in circles of solid lines.

Here, the construction of the conducting part 10 is discussed referring to FIG. 2(c). The conducting part 10 includes a conducting member 12, which is disposed in the sealing member 14. The conducting member 12 has a diameter corresponding to a gap between the upper substrate 4a and the lower substrate 4b and is a spherical member having conductivity. Further, the conducting member 12 is in contact with the scanning electrode 6a and the scanning electrode terminal 8a so as to achieve electrical conduction therebetween.

Subsequently, referring to FIGS. 4(a) to 4(c), a forming method of the conducting parts 10 is discussed. FIGS. 4(a) to 4(c) are sectional views showing a forming process of the conducting part 10. In this case, glass substrates are used as the upper substrate 4a and the lower substrate 4b.

To form the conducting parts 10, the conducting members 12 are firstly dispersed into a sealing material forming the sealing member 14.

Here, a material such as an epoxy resin and an acrylate resin is applicable as the sealing material. Further, it is also possible to adopt a substrate made of a material such as plastic is coated with a material such as Au and Ni having a high conductivity. And then, the conducting members 12 are suitably dispersed into the sealing material without aggregation. When the dispersion is insufficient and the conducting members 12 are aggregated, the conducting members 12 may be in contact with one another between the adjacent scanning electrode terminals 8a so as to cause a short circuit between the scanning electrode terminals 8a.

The above sealing material is applied to, for example, areas on which the sealing member 14 should be formed (indicated by sloped lines in FIG. 2(a)) on the lower substrate 4b. The upper substrate 4a is aligned and opposed to the lower substrate 4b (see FIG. 4(a)). The upper substrate 4a and the lower substrate 4b are gradually brought close to each other, so that the sealing material between the con-ducting member 12, the scanning electrodes 6a, and the scanning electrode terminals 8a are gradually squeezed out, and then, the conducting members 12 come into contact with the scanning electrodes 6a and the scanning electrode terminals 8a (see FIG. 4(b)). Further, the upper substrate 4a and the lower substrate 4b are pressed so as to expand contact areas between a) the conducting members 12, and b) the scanning electrodes 6a and the scanning electrode terminals 8a, thereby securing conduction therebetween (see FIG. 4(c)).

Additionally, after applying the sealing material, the conducting members 12 may be dispersed only on predetermined parts (conducting parts 10) of the sealing material so as to form the sealing member 14. Hence, it is possible to minimize a quantity of the conducting members 12.

As described above, the sealing material is cured while securing the conduction, so that the upper substrate 4a and the lower substrate 4b are integrated and the conducting parts 10 are formed. Here, the conducting parts 10 formed in the above explanation are normal ones.

In the conducting parts 10 formed in the above manner, the conducting members 12 are dispersed into the sealing material with a proper density. Thus, it is possible to prevent the conducting members 12 from being in contact with one another in a lateral direction (surface direction of the upper substrate 4a and the lower substrate 4b). Therefore, the conduction of the conducting members 12 is limited to a vertical direction. (perpendicular to a surface direction of the upper substrate 4a and the lower substrate 4b), so that the adjacent scanning electrodes 6a and the adjacent scanning electrode terminals 8a are insulated with each other.

Figure 5A:
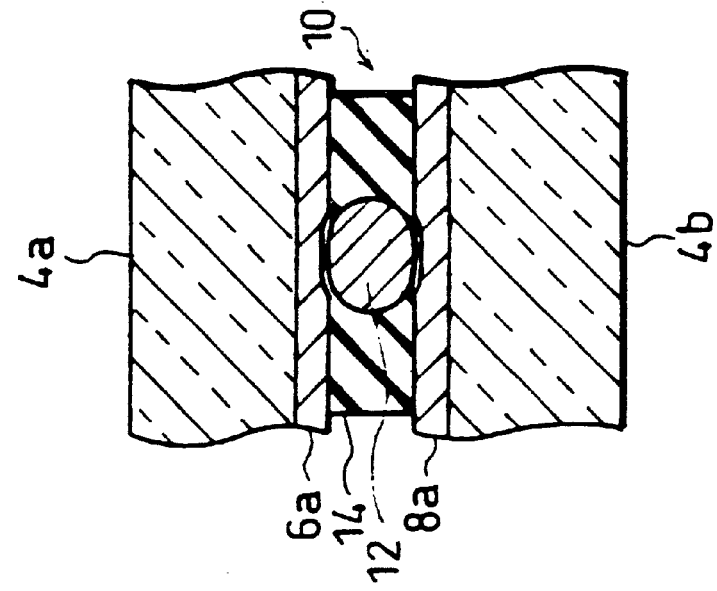
FIGS. 5(a) to 5(c) are sectional views showing the order of forming steps of the conducting part in the event of a conduction defect.
Figure 5B:
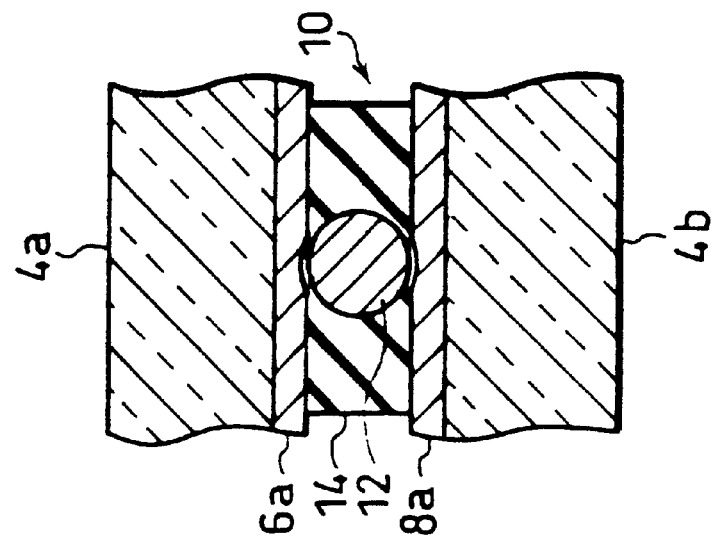
Figure 5C:
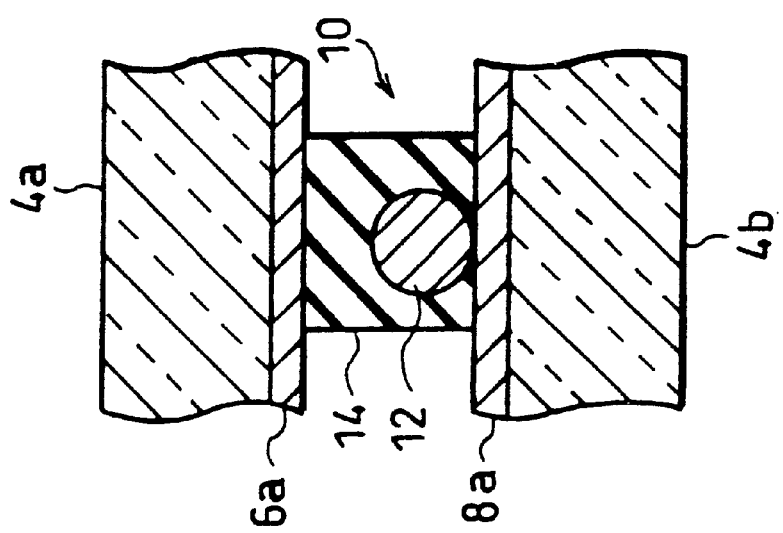

Meanwhile, when forming the conducting parts 10, a conduction defect may appear. This case will be described referring to FIGS. 5(a) to 5(c). FIGS. 5(a) to 5(c) are sectional views showing a forming process of the conducting parts 10 in the event of a conduction defect.

Here, the above conduction defect is likely to occur when substrates made of a polymeric material such as plastic and resin are used as the upper substrate 4a and the lower substrate 4b. A defect exists while the conducting parts 10 are normal. The polymeric material is generally smaller than glass in weight; thus, in the case of the substrate made of a polymeric material, it is possible to reduce a weight of the liquid crystal display device.

Also, when glass substrates are used as the upper substrate 4a and the lower substrate 4b, although the occurrence is smaller as compared with resin, a conduction defect may appear.

In this case, at a step in which the sealing material is applied and the upper substrate 4a and the lower substrate 4b are opposed to each other while alignment is made (see FIG. 5(a)) the construction is not different from the foregoing one.

However, when the upper substrate 4a and the lower substrate 4b are gradually brought close to each other, the conducting members 12 are still coated with the sealing material without sufficient removal, thereby interfering with contact between a) the conducting members 12 and b) the scanning electrodes 6a and the scanning electrode terminals 8a (see FIG. 5(b)). This is because the upper substrate 4a and the lower substrate 4b are made of a resin with a small surface hardness (hardness on a surface), so that deformation occurs on surfaces of the upper substrate 4a and the lower 4b and a pressure is not sufficiently applied onto the sealing member. And then, when the upper substrate 4a and the lower substrate 4b are pressed, large deformation appears on the, upper substrate 4a and the lower substrate 4b. Hence, the conducting members, 12 do not come into contact with the scanning electrodes 6a and the scanning electrode terminals 8a (see FIG. 5(c)).

A part having a conduction defect on the conducting part 10 forms a capacity (capacitor) by application of ac voltage (driving voltage), which drives the liquid crystal panel 2, resulting in a drop in a driving voltage on the capacity. Consequently, when the cell 2b is composed of the scanning electrode 6a which is connected to the defective conducting part 10, generated voltage (i.e., intensity of an electric field) is smaller as compared with the cell 2b composed of the scanning electrode 6a which is connected to the normal connecting part 10, resulting in a display defect such as a small luminance.

In the present embodiment, in order to correct a defect on the conducting part 10, the following operations (will be described referring to FIGS. 1(a) and 1(b)) are performed on the liquid crystal panel 2 after forming the conducting parts 10. FIG. 1(a) is a plan view showing the construction for practicing a method of correcting a conduction defect according to the present embodiment. FIG. 1(b) is a side view showing the construction.

Additionally, regarding the liquid crystal panel 2 of FIGS. 1(a) and 1(b), the construction of the display section 2a on the liquid crystal panel 2 and the construction between the upper substrate 4a and the lower substrate 4b are omitted but are described referring to FIGS. 2(a), 2(b), 3(a), and 3(b).

Further, in FIGS. 1(a) and 1(b), the scanning electrode terminals 8a are divided into two groups and the data electrode terminals 8b form one group. However, the arrangement may be arbitrarily changed according to a layout of the scanning electrode terminals 8a and the data electrode terminals 8b. Moreover, members (described later) including first connecting members 34a and a second connecting member 34b (connecting members 34 and conductive elastic member), a first cable 32a and a second cable 32b (cable 32), first output terminals 31a and a second output terminal 31b (output terminal 31) are disposed so as to correspond to the layout of the scanning electrode terminals 8a and the data electrode terminals 8b.

A voltage application device 30 of the present embodiment includes output terminals 31. And then, the voltage application device 30 is operated so as to generate ac voltage between the first output terminals 31a and the second output terminal 31b. A waveform, voltage, and frequency of an ac voltage, which is generated in the voltage application device 30, can be set according to the following conditions.

Cables 32 and connecting members 34 are used for connecting a) the output terminals 31 of the voltage application device 30 and b) the scanning electrode terminals 8a and the data electrode terminals 8b on the liquid crystal display panel 2. Here, the ends of the first cable 32a and the second cable 32b are respectively connected to the first output terminal 31a and the second output terminal 31b, and the other ends are respectively connected to the first connecting member 34a and the second connecting member 34b. Besides, the first connecting members 34a and the second connecting member 34b are respectively disposed on the scanning electrode terminals 8a and the data electrode terminals 8b.

In this case, the connecting members 34 are disposed on the terminals 8 (scanning electrode terminals 8a and data electrode terminals 8b) so as to come into contact with the terminals 8, so that the connecting members 34 and the terminals 8 are electrically connected with each other. Furthermore, the connecting members 34 are electrically conducting between the connecting parts of the cables 32 and the contact parts of the terminals 8. Hence, a material with conductivity and elasticity is preferably used for the connecting members 34. For example, a material including a conductive rubber is applicable. In the case of the conductive rubber, a damage such as scratch is less likely to appear on the lower substrate 4b or the terminals 8.

Additionally, a prober composed of a number of metallic pins (pins) 35 is applicable in place of the connecting members 34. This construction is described referring to FIGS. 6(a) and 6(b). FIG. 6(a) is a plan view showing another construction for practicing the conduction defect correcting method according to the present embodiment. FIG. 6(b) is a side view showing the construction. Here, those members that have the same functions and are described referring to FIG. 1 are indicated by the same reference numerals and the description thereof is omitted.

When metallic pins 35 are used, electrical connection can be made on each pattern of the terminals 8 so as to establish connection in a more positive manner. Further, ac voltage can be applied according to the patterns of the terminals 8, so that ac voltage can be applied only to the specific conducting parts 10. Consequently, a conduction defect can be partially corrected, so that a more flexible operation is available.

Here, as a device having the above construction, it is also possible to share a device which is used for applying voltage between the scanning electrode terminals 8a and the data electrode terminals 8b in a process such as a lighting display inspection in a manufacturing process of a liquid crystal display device. In this case, the device and instruments are shared so as to simplify the facilities and process.

According to this arrangement (shown in FIG. 1 or 6), when ac voltage is applied between the scanning electrode terminals Ba and the data electrode terminals 8b, ac voltage is applied to a plurality of the conducting parts 10 (see FIG. 2(c)) in parallel. Therefore, ac voltages with equal values are applied together to the conducting parts 10. Thus, the effect of correcting a defect (described later) equalizes contact resistances on the conducting parts 10, thereby suppress unevenness, etc. on a display image.

It is preferable to apply ac voltage after the liquid crystal material 16 is filled between the upper substrate 4a and the lower substrate 4b. This arrangement makes it possible to stabilize a gap between the upper substrate 4a and the lower substrate 4b so as to prevent a short circuit resulted from a contact between the scanning electrodes 6a and the data electrodes 6b. In this case, a potential applied from the data electrode terminals 8b is applied to the scanning electrodes 6a via the liquid crystal material 16 (see FIGS. 2(a) and 2(b)).

Next, referring to FIGS. 5(a) to 5(c), the following explanation describes the effect of correcting a conduction defect that is achieved by applying ac voltage to the conducting parts 10.

When the conducting part 10 has a conduction defect, as described above, a capacity is formed thereon. When ac voltage is applied to the capacity, energy is consumed due to dielectric dissipation in the sealing material (hereinafter, referred to as an intermediate sealing material) which forms a capacity between the upper substrate 4a, the lower substrate 4b and the conducting member 12. The energy consumption is determined according to an rms value of applied ac voltage. To be specific, the larger rms value of ac voltage applied to the conducting section 10, the larger energy consumption in the conducting part 10.

Energy consumed in the conducting part 10 turns into heat and raises a temperature of the conducting part 10. Here, when a material softened with temperature is used as a sealing material for forming the sealing member 14 in the conducting parts 10, the sealing material may be softened according to a temperature increased by ac voltage application.

Moreover, in the conducting part 10 having a conduction defect, as shown in FIG. 5(c), the upper substrate 4a and the lower substrate 4b are partially deformed, so that stress occurs thereon. Hence, when ac voltage softens the intermediate sealing material as described above, the stress is released so as to correct the deformation of the upper substrate 4a and the lower substrate 4b and to remove the intermediate sealing material between the upper substrate 4a, the lower substrate 4b, and the conducting members 12. Consequently, electrical conduction is established between the upper substrate 4a, the lower substrate 4b, and the conducting members 12 so as to correct the conduction defect.

Also, when ac voltage is applied to the conducting part 10 having a conduction defect, puncture may occur in the intermediate sealing material, which maintains insulation between the upper substrate 4a, the lower substrate 4b, and the conducting members 12. Hence, when puncture occurs in the intermediate sealing material, electrical conduction is established between the upper substrate 4a, the lower substrate 4b, and the conducting members 12 so as to correct a conduction defect.

Figure 10:
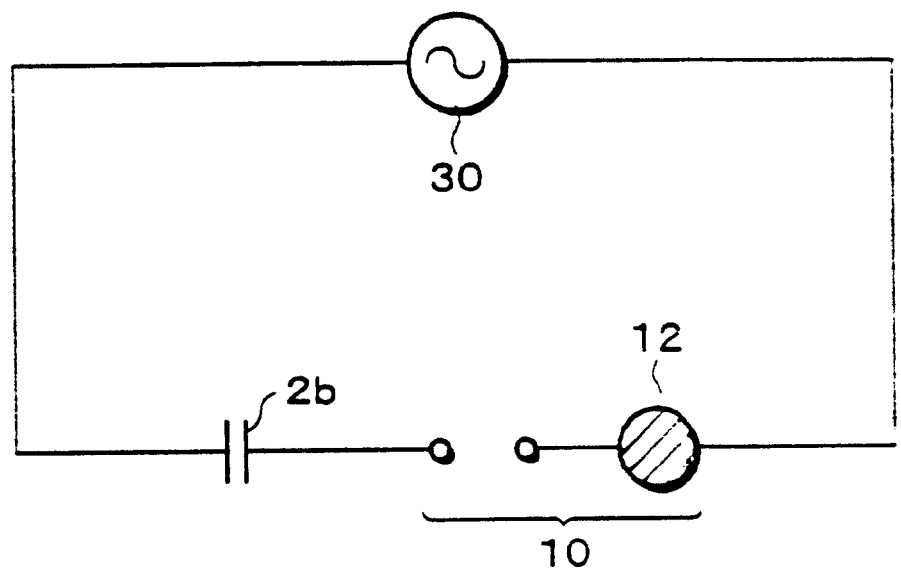
FIGS. 10(a) and FIG. 10(b) are schematic views showing a circuit in which a conduction defect on the conducing part is corrected.
Figure 10:
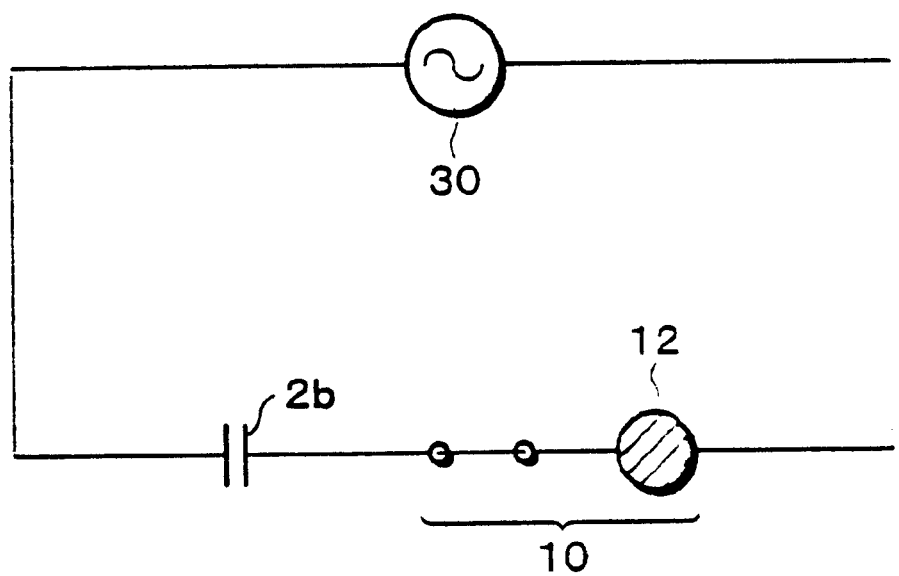

FIGS. 10(a) and 10(b) schematically show correction of a conduction defect. FIGS. 10(a) and 10(b) are schematic views showing a circuit in which a conduction defect is under correction in the conducting part 10. FIG. 10(a) shows a state before correction, and FIG. 10(b) shows a state after correction. In these figures, those members that correspond to the foregoing members are indicated by the same reference numerals. In the state of FIG. 10(a), the conducting part 10 is insulated by the intermediate sealing material. In this state, when ac voltage is applied as described above, the state turns into FIG. 10(b), in which insulation on the conducting part 10 is removed and the state is back to normal.

Subsequently, referring to FIGS. 1(b) to 2(c), the following explanation discusses the conditions of correcting a conduction defect on the liquid crystal panel 2. First, an amplitude (maximum voltage value) of ac voltage applied from the voltage application device 30 (hereinafter, referred to as an applied voltage) is preferably set at higher than a driving voltage of the liquid crystal material 16 and lower than 500V. The liquid crystal material 16 is sandwiched between the upper substrate 4a and the lower substrate 4b.

Here, when an applied voltage is at or smaller than a driving voltage of the liquid crystal material 16, energy applied to the conducting part 10 may become insufficient to obtain the effect of correcting a conduction defect (hereinafter, simply referred to as a conduction defect correcting effect) on the conducting part 10. Thus, it may be difficult to secure the conduction defect correcting effect. Additionally, a driving voltage of the liquid crystal material 16 generally ranges from 1.5 to 3 V, although it differs between kinds of the liquid crystal material 16 and the liquid crystal display device.

Therefore, it is preferable to set an applied voltage at more than 1.5 V and more preferable at more than 3 V.

Meanwhile, the conduction defect correcting effect is enhanced at a higher applied voltage. The voltage is also applied to the liquid crystal material 16 so as to accelerate the electrolysis of the liquid crystal material 16. Particularly when a voltage larger than 500 V is applied to the liquid crystal material 16 in the liquid crystal panel 2, the electrolysis of the liquid crystal panel 16 may be enhanced so as to degrade the liquid crystal material 16.

For this reason, an applied voltage is set at higher than a driving voltage, of the liquid crystal material 16 and lower than 500 V, so that the conduction defect correcting effect can be improved while preventing degradation of the liquid crystal material 16.

And then, the following discusses a frequency of ac voltage (hereinafter, simply referred to as frequency) that is applied from the voltage application device 30. The frequency is preferably set at higher than 10 Hz and lower than 10 kHz. When the frequency is 10 Hz or less, a dc component is increased in an applied ac voltage. Generally, the liquid crystal material 16 is more prone to degradation by dc current rather than ac current. Thus, a lower frequency accelerates the degradation of the liquid crystal material 16. Particularly a frequency at 10 Hz or less may considerably degrade the liquid crystal material 16.

Meanwhile, a higher frequency increases impedance on parts including the connecting members 34, the scanning electrodes 6a, and the data electrodes 6b other than the conducting parts 10. With an increase in impedance on the parts other than the conducting parts 10, it is difficult to apply energy into the conducting parts 10. Namely, an efficiency decreases during energy application to the conducting parts 10. Particularly in the case of a frequency of 10 kHz or more, the energy applying efficiency may be considerably reduced so as to suppress the conduction defect correcting effect.

Therefore, a frequency is set at higher than 10 Hz and lower than 10 kHz so as to improve the conduction defect correcting effect while preventing the degradation of the liquid crystal material 16.

Next, the following explanation discusses a waveform of ac voltage (hereinafter, simply referred to as a waveform) applied from the voltage application device 30. Here, the liquid crystal material 16 is degraded by the influence of an electric field which appears due to voltage applied to the liquid crystal material 16. When a maximum voltage value is high, the electric field is high in intensity. On the other hand, the conduction defect correcting effect is achieved by energy applied to the conducting parts 10. To increase applied energy, it is necessary to raise an rms value of applied ac voltage.

Figure 7A:
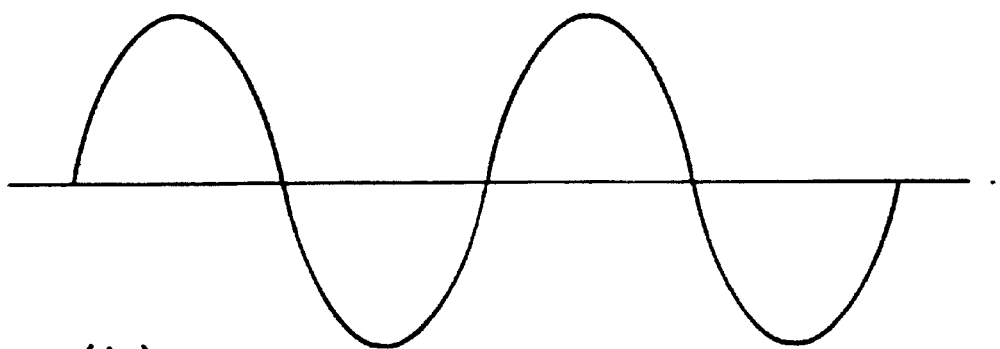
FIGS. 7(a), 7(b), and 7(c) are explanatory drawings respectively showing a sin waveform, a rectangular waveform, and a sawtooth waveform.
Figure 7B:
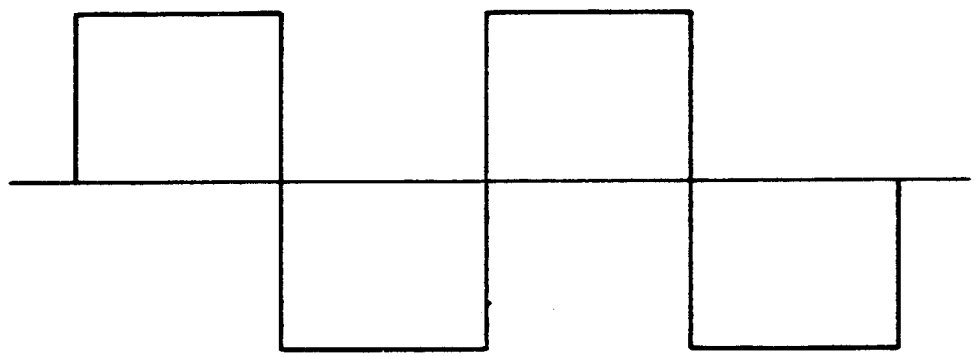
Figure 7C:
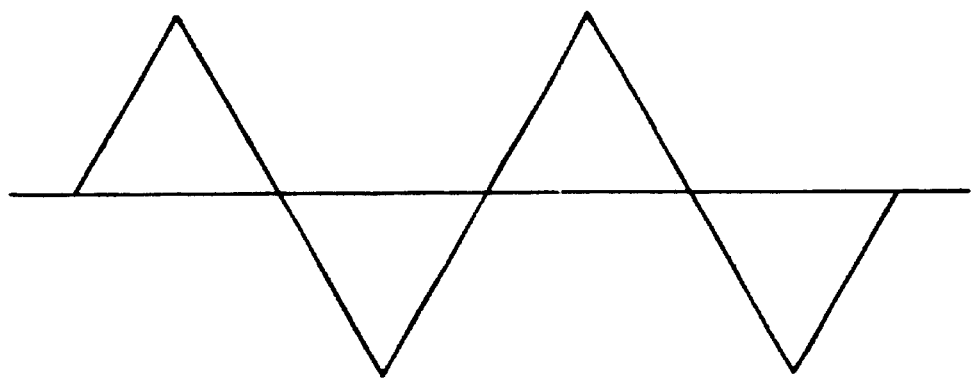
Figure 8A:
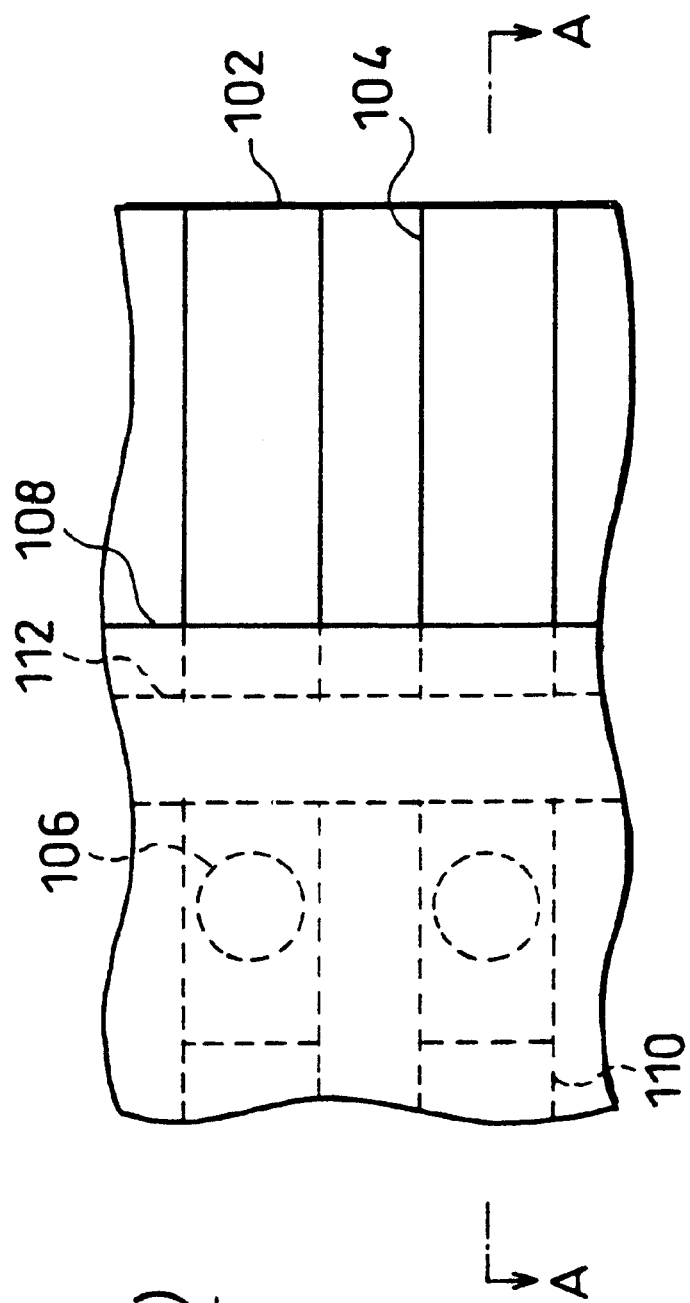
FIG. 8(a) is a plan view showing the construction of a conducting part in a direct matrix liquid crystal display device according to a conventional art.
Figure 8B:
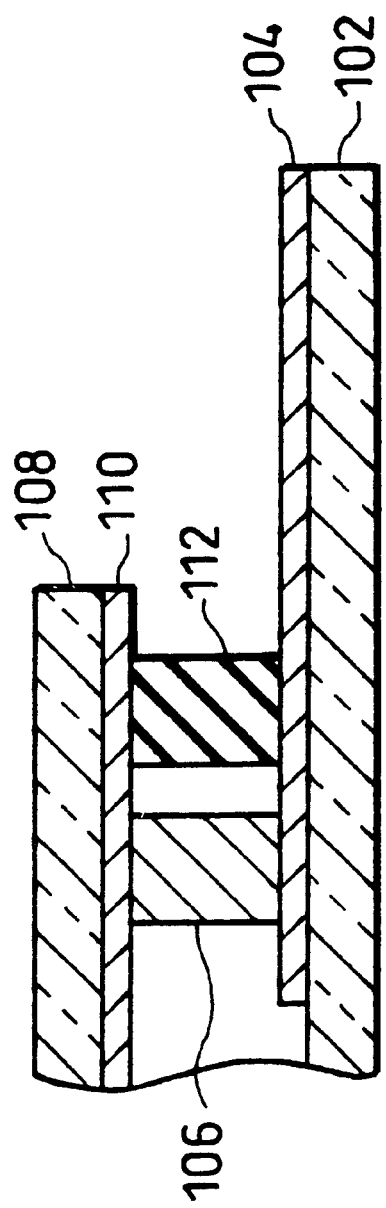
FIG. 8(b) is a sectional view taken along line A—A shown in FIG. 8(a).
Figure 9A:
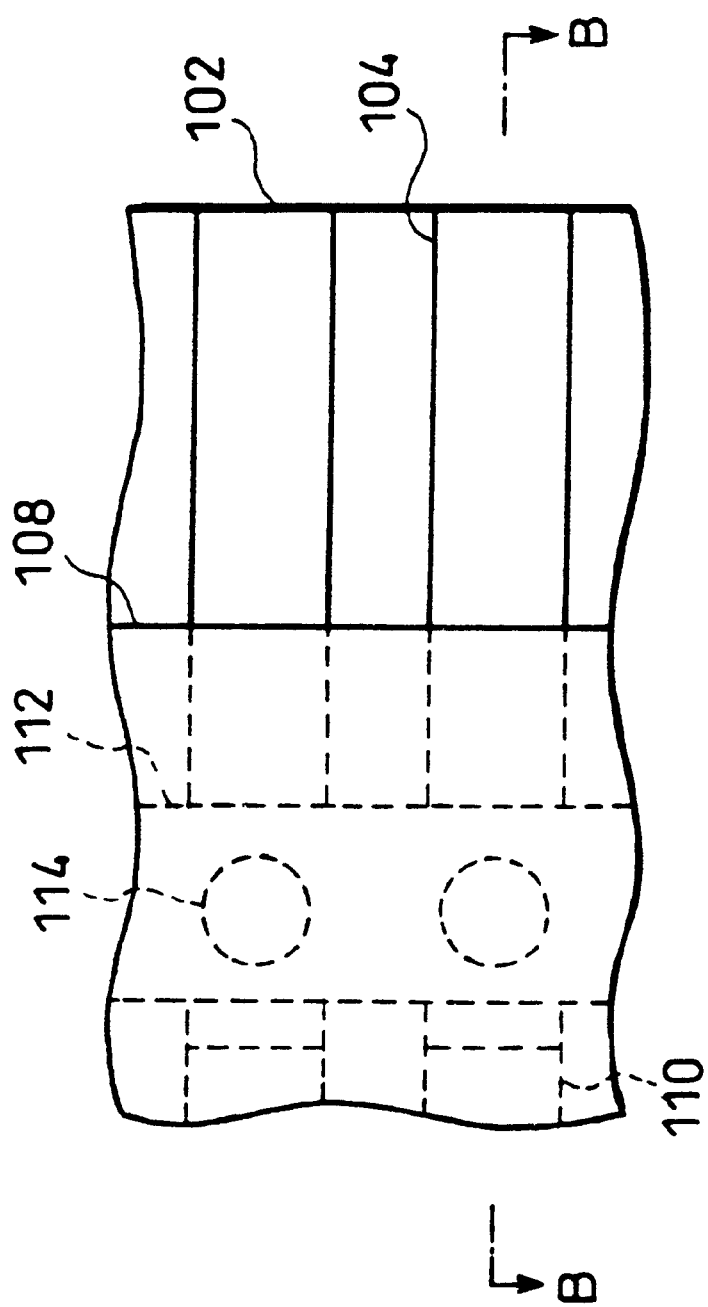
FIG. 9(a) is a plan view showing another construction a conducting part in a direct matrix liquid crystal display device according to a conventional art.
Figure 9B:
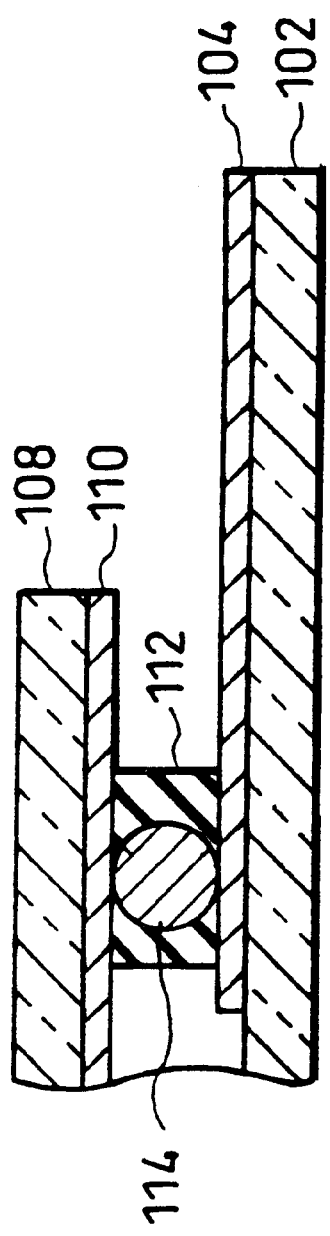
FIG. 9(b) is a sectional view taken along line A—A shown in FIG. 9(a).

For this reason, in the case of equal maximum voltage values, it is preferable to adopt a waveform with a higher rmf value of voltage. For example, waveforms such as a sin wave, a rectangular wave, a sawtooth wave are applicable. FIGS. 7(a) to 7(c) are explanatory drawings showing examples of these waveforms. FIG. 7(a) shows a sin waveforms, FIG. 7(b) shows a rectangular waveform, and FIG. 7(c) shows a sawtooth waveform.

Here, regarding the sin waveform, the rectangular waveform, and the sawtooth waveform, ratios of an rms value to a maximum voltage value are respectively $(1/2)^{1/2}$, 1, and $(2/3)^{1/2}$. Hence, in the case of equal maximum voltage values, an rms value is higher in the order of the rectangular wave form, the sawtooth waveform, and the sin waveform.

For this reason, the rectangular waveform is the most preferable as a waveform to be applied. The rectangular waveform can improve the conduction defect correcting effect while suppressing degradation of the liquid crystal material 16.

Further, when time to apply ac voltage is equal to or more than time to apply an rms voltage, i.e., time corresponding to one waveform (a cycle) of applied ac voltage, it is possible to obtain the conduction defect correcting effect. In order to improve the conduction defect correcting effect, application time is preferably set at one second or more. Meanwhile, when ac voltage is applied for a long time, the conduction defect correcting effect is prone to saturation, so that several seconds (e.g., 10 seconds or less) are appropriate in view of workability.

Here, the above explanation discussed the conduction defect correcting method for a direct matrix liquid crystal display device according to the present invention. The present invention is not limited to this method but is effective for a construction in which separately formed electrodes, etc. are electrically conducting to each other via conducting members embedded into a sealing material, etc. between substrates.

Besides, according to the conduction defect correcting method of the present invention, on the liquid crystal panel 2 having the conductive members for connecting the electrodes, a high ac voltage is applied to electrode pattern wires such as the terminals connecting to a driving circuit. Thus, it is possible to equalize contact resistances on a part having an abnormal contact resistance that occurs in the conducting part 10 between the electrodes and the other parts having normal contact resistances.

As a result, it is possible to correct a display defect such as an unavailable display and irregularity in sharpness that is caused by uneven contact resistances of the conducting parts 10 between the electrodes. Moreover, a yield of the liquid crystal display device can be improved by correcting a display defect. Particularly when a substrate is made of a material such as plastic having a small surface hardness, the above method is quite effective.

As earlier mentioned, according to the conduction defect correcting method for the liquid crystal display device of the present embodiment, ac voltage is applied from the conductive wires to the conducting parts 10 surrounded by the sealing member 14, while the conducting members 12 having conductivity are sandwiched between the conductive wires (scanning electrodes 6a and scanning electrode terminals 8a) formed on a pair of the substrates (upper substrate 4a and lower substrate 4b).

To be specific, the substrates are respectively provided with first electrodes (scanning electrodes 6a) and second electrodes (data electrodes 6b) that are opposed to each other via the liquid crystal material 16. Conductive wires formed on one of the substrates (upper substrate 4a) is the first electrodes, and conductive wires formed on the other substrate (lower substrate 4b) are first terminals (scanning electrode terminal 8a) for applying a potential to the first electrodes. Further, ac voltage is applied between the first terminals and second terminals (data electrode terminal 8b) for applying a potential to the second electrodes.

Additionally, when ac voltage is applied between the first terminals and the second terminals, it is preferable to apply ac voltage via conductive elastic members (connecting members 34) which come into contact with the first terminals and the second terminals.

According to this method, when applying ac voltage to the first terminals and the second terminals, a conductive elastic member such as conductive rubber is brought into contact with the terminals so as to make electrical connection. It is therefore possible to prevent damage such as a flaw and a crack on the substrates, the first terminals, and the second terminals.

Or when ac voltage is applied between the first terminals and the second terminals, it is preferable to apply ac voltage via conductive pins (metallic pins 35) which are in contact with the first terminals and the second terminals.

According to this method, the conductive pins can make electrical connection for each pattern of the first terminals and the second terminals so as to make connection in a more positive manner. Furthermore, ac voltage can be applied according to each pattern of the first terminals and the second terminals, so that ac voltage can be applied only to the specific ones of a plurality of the conducting parts 10. Consequently, it is possible to partially correct a conduction defect so as to perform an operation in a more flexible manner.

Also, a maximum value of applied ac voltage is preferably set at higher than a driving voltage of the liquid crystal material 16 and lower than 500 V.

When a maximum value of applied ac voltage is equal to or smaller than a driving voltage of the liquid crystal material 16, a conduction defect may be insufficiently corrected due to a low voltage. On the other hand, when a maximum value of applied ac voltage is 500 V or more, electrolysis may be accelerated in the liquid crystal material 16 during application of ac voltage, thereby degrading the liquid crystal material 16.

Therefore, a maximum value of applied ac voltage is set within the above-mentioned range so as to improve the effect of correcting a conduction defect while preventing degradation of the liquid crystal material 16.

Additionally, it is preferable to set a frequency of applied ac voltage at higher than 10 Hz and lower than 10 kHz.

The liquid crystal material 16 is more prone to electrolysis by dc voltage than ac voltage. Here, when a frequency of applied ac voltage is 10 Hz or less, ac voltage has more dc components, so that electrolysis may be accelerated in the liquid crystal material 16.

Meanwhile, when an applied ac voltage has a frequency of 10 kHz or more, impedance is increased on a path for applying ac voltage in the conductive elastic member and so on. Thus, it may be difficult to apply a predetermined voltage to the conducting parts 10, thereby suppressing the conduction defect correcting effect.

Consequently, a frequency of applied ac voltage is set within the foregoing range so as to improve the conduction defect correcting effect while preventing degradation of the liquid crystal material 16.

Moreover, applied ac voltage preferably has a rectangular waveform.

Degradation of the liquid crystal material 16 depends upon a maximum value of voltage applied to the liquid crystal material 16. In contrast, the conduction defect correcting effect depends upon an rms value of applied voltage. According to this method, ac voltage with a rectangular waveform can provide a larger rms value relative to the same maximum voltage value. Consequently, with ac voltage with a rectangular waveform, it is possible to prevent degradation of the liquid crystal material 16 while suppressing a maximum voltage value and to improve the conduction defect correcting effect.

Besides, in the manufacturing method of the liquid crystal display device according to the present embodiment, ac voltage is applied between the conductive wires after a pair of the substrates (the upper substrate 4a and the lower substrate 4b) are bonded to each other while parts of the sealing member 14 that correspond to the conducing members 12 are disposed between the conductive wires (the scanning electrode 6a and the scanning electrode terminal 8a).

Furthermore, it is preferable to use a substrate made of a polymeric material.

The substrate made of a polymeric material such as plastic and resin can achieve a light-weight liquid crystal display device as compared with a material such as glass. However, the polymeric material is smaller than glass in surface hardness. Thus, when the polymeric material is used for the substrate, the substrate is likely to be deformed at contact between the conducting members 12 and the conductive wires via the sealing member 14, resulting in a conduction defect.

In contrast, with the method of the present invention, it is possible to correct a conduction defect as described above by applying ac voltage between the conductive wires after bonding the substrates. Consequently, the present invention makes it possible to provide a method of manufacturing a light-weight liquid crystal display device with a high yield by suppressing the occurrence of a conduction defect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A conduction defect correcting method for a liquid crystal display device, said device including:

a pair of substrates having a liquid crystal material therebetween, conductive wires respectively formed on opposing surfaces of said substrates, a conducting part having a conducting member with conductivity between said conductive wires, and a sealing member provided around said conducting part to bond a pair of said substrates together, said method comprising the step of applying ac voltage from each of said conductive wires to said conducting part.

2. The conduction defect correcting method for the liquid crystal display device as defined in claim 1, wherein said device includes a plurality of said conducting parts and said ac voltage is applied to a plurality of said conducting parts in parallel.

3. The conduction defect correcting method for the liquid crystal display device as defined in claim 1, said device including:

a first electrode and a second electrode which are respectively formed on said substrates so as to oppose each other via said liquid crystal material, one of said conductive wires that is formed on one of said substrates acting as said first electrode, and said other conductive wire formed on said other substrate acting as a first terminal for applying a potential to said first electrode, said method comprising the step of applying said ac voltage between said first terminal and a second terminal for applying a potential to said second electrode.

4. The conduction defect correcting method for the liquid crystal display device as defined in claim 3, wherein said ac voltage is applied via conductive elastic members which are in contact with said first terminal and said second terminal respectively.

5. The conduction defect correcting method for the liquid crystal display device as defined in claim 3, wherein said ac voltage is applied via conductive pins which are in contact with said first terminal and said second terminal respectively.

6. The conduction defect correcting method for the liquid crystal display device as defined in claim 3, wherein said applied ac voltage has a maximum value, which is higher than a driving voltage of said liquid crystal material and is lower than 500 V.

7. The conduction defect correcting method for the liquid crystal display device as defined in claim 3, wherein said applied ac voltage has a frequency of higher than 10 Hz and lower than 10 kHz.

8. The conduction defect correcting method for the liquid crystal display device as defined in claim 3, wherein said applied ac voltage has a rectangular waveform.

9. A manufacturing method of a liquid crystal display device, said device including conductive wires which are respectively formed on opposing surfaces of a pair of substrates having a liquid crystal material therebetween and which are electrically connected to each other via a conducting member with electrical conductivity disposed into a sealing member for bonding a pair of said substrates together, said method comprising the step of applying ac voltage between said conductive wires after a pair of said substrates are bonded to each other while a part of said sealing member that has said conducting member is disposed between said conductive wires.

10. The manufacturing method of the liquid crystal display device as defined in claim 9, wherein a substrate made of a polymeric material is used as each of said substrates.

11. The conduction defect correcting method for the liquid crystal display device as defined in claim 1, wherein a substrate made of a polymeric material is used as each of said substrates.

12. The conduction defect correcting method for the liquid crystal display device as defined in claim 1, wherein said conducting member is formed by coating a surface of a substrate made of plastic with a material selected from a group consisting of Au and Ni.

13. The conduction defect correcting method for the liquid crystal display device as defined in claim 1, wherein said sealing member is made of a material selected from a group consisting of an epoxy resin and an acrylic resin.

14. The conduction defect correcting method for the liquid crystal display device as defined in claim 3, wherein said first electrode and said second electrode are opposed to each other via said liquid crystal material so as to form a capacitor.

15. The conduction defect correcting method for the liquid crystal display device as defined in claim 4, wherein said conductive elastic members are made of conductive rubber.

* * * * *